US006540039B1

(12) United States Patent
Yu et al.

(10) Patent No.: US 6,540,039 B1
(45) Date of Patent: Apr. 1, 2003

(54) OMNIDIRECTIONAL VEHICLE WITH OFFSET WHEEL PAIRS

(75) Inventors: Haoyong Yu, Cambridge, MA (US); Steven Dubowsky, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/631,842

(22) Filed: Aug. 3, 2000

Related U.S. Application Data
(60) Provisional application No. 60/149,824, filed on Aug. 19, 1999.

(51) Int. Cl.[7] ............................................... B60K 17/30
(52) U.S. Cl. ........................ 180/253; 180/264; 180/237
(58) Field of Search ............................... 180/65.5, 253, 180/252, 264, 265, 263, 236, 237, 266, 267; 280/124.114; 16/47, 48, 29

(56) References Cited

U.S. PATENT DOCUMENTS 3,910,368 A * 10/1975 Weber et al. ............. 180/26 R
4,057,158 A    11/1977 Lissy ......................... 214/330

(List continued on next page.)

FOREIGN PATENT DOCUMENTS

EP    0 716 974 A1    6/1996
JP    6-191203    *  7/1994

OTHER PUBLICATIONS

Dubowsky, et al. *PAMM—A Robotic Aid to the Elderly for Mobility Assistance and Monitoring: A "Helping–Hand" for the Elderly*; Proceedings of the IEEE, International Conference on Robotics & Automation, San Francisco, CA; pp. 570–576; Apr. 2000.

Ferrière, et al. *ROLLMOBS, A New Omnimobile Robot*; Proc. IROS'97; pp. 913–918.
Ferrière, et al. *ROLLMOBS, A New Universal Wheel Concept*; Proceedings of the IEEE, International Conference on Robotics & Automation, Leuven, Belgium; pp. 1877–1882; May, 1998.
Muir, et al. *Kinematic Modeling For Feedback Control of an Omnidirectional Wheeled Mobile Robot*; IEEE, International Conference on Robotics & Automation; pp. 1772–1778; 1987.
Pin, et al. *A New Family of Omnidirectional and Holonomic Wheeled Platforms for Mobile Robots*; IEEE Transactions on Robotics and Automation: vol. 10, No. 4; pp. 480–489; Aug., 1994.
Wada, et al. *Holonomic and Omnidirectional Vehicle with Conventional Tires*; Proceedings of the IEEE, International Conference on Robotics & Automation, Minneapolis, Minnesota; 3671–76; Apr., 1996.
West, et al. *Design of Ball Wheel Mechanisms for Omnidirectional Vehicles with Full Mobility and Invariant Kinematics*; Journal of Mechanical Design, vol. 119; pp. 153–161; Jun., 1997.

*Primary Examiner*—Avraham Lerner
(74) *Attorney, Agent, or Firm*—Bromberg & Sunstein LLP

(57) ABSTRACT

A wheel base or mobile platform providing omnidirectional motion and control. At least two offset wheel assemblies are coupled to a platform that supports a load. Each offset wheel assembly has two wheels that share a common axis and a mechanical link that is pivotally coupled to a pivot point on the rigid platform and supports the two wheels in such a manner that the common axis is displaced from the pivot point. The common axis of the wheels is free to rotate about an axis parallel to the planes of rotation of the wheels. The platform may be turned in any direction specified by a user from any instantaneous configuration or velocity in accordance with a method uniquely specifying a torque to be applied to each of the wheels while each of the wheels is in rolling motion.

8 Claims, 5 Drawing Sheets

U.S. PATENT DOCUMENTS

| | | | |
|---|---|---|---|
| 4,599,030 A | * 7/1986 | Skaalen et al. | 414/460 |
| 5,242,131 A | 9/1993 | Watts | 244/103 |
| 5,379,842 A | * 1/1995 | Terry | 180/21 |
| 5,547,038 A | * 8/1996 | Madwed | 180/253 |
| 5,704,568 A | 1/1998 | Watts | 244/50 |
| 5,924,512 A | 7/1999 | Wada | 180/253 |
| 5,964,471 A | 10/1999 | Copland | 280/47.11 |
| 5,967,348 A | * 10/1999 | Jussila | 212/344 |
| 6,109,379 A | * 8/2000 | Madwed | 180/65.5 |

* cited by examiner

OMNIDIRECTIONAL VEHICLE WITH OFFSET WHEEL PAIRS

This application claims priority from provisional application No. 60/149,824, which was filed Aug. 19, 1999 and is hereby incorporated herein by reference.

TECHNICAL FIELD

The present invention pertains to a steering configuration for providing omnidirectional maneuverability, and, more particularly, to a steering arrangement having at least two pairs of offset wheels.

BACKGROUND OF THE INVENTION

A platform with omnidirectional mobility can move instantaneously in any specified direction across a surface from any current configuration of the platform. The word "arbitrary," as used in this application and in any appended claims, will mean "as specified by a user." Thus, an omnidirectional vehicle can be said to be movable in an arbitrary direction on a continuously smooth surface.

Omnidirectional platforms or mobility bases provide obvious advantages in applications where a vehicle transporting a human subject or other load is to be used in congested rooms with static and/or dynamic obstacles and narrow aisles such as commonly found in nuclear plants, offices, factory workshops and warehouses, eldercare facilities and hospitals. Such platforms provide for enhanced maneuverability for mobile robots or automated vehicles in industry, military, personal, healthcare and other applications.

Various deficiencies are apparent in existing mobility designs. Classical wheeled mobile platform design, such as employed in three-wheel skid steering type mobile robots or in four-wheel car type mobile robots, suffers from limited mobility due to the non-holonomic constraints of the wheels. Hence, the motion of these vehicles is not truly omnidirectional. While such vehicles can reach any position and orientation in a plane, they need very complex maneuvers and require complicated path planning and control strategies in these environments. It is thus highly desirable for robots and vehicles to have omni-directional mobility for such applications.

Two approaches for achieving omnidirectional or near omnidirectional motion capability can be distinguished: special wheel design and conventional wheel design. Most special wheel designs are based on the universal wheel concept, which achieves traction in one direction and allows passive motion in another direction.

One type of special wheel design, called a ball wheel mechanism, is described by West & Asada, Design of Ball wheel Mechanisms for Omnidirectional Vehicles With Full Mobility and Invariant Kinematics, *Journal of Mechanical Design*, vol. 119, pp. 153–161 (June, 1997). In the design of West & Asada, two rings of rollers hold a solid ball. The power from a motor is transmitted, through gears meshed with teeth on an active ring, to the solid ball via friction between the roller and the ball. The other ring roller is mounted to the chassis and its rollers are free to rotate. Thus the ball will have a free motion around the ring axis as a result of the motion of other balls for the mobility platform. With a minimum of three such ball wheel assemblies an omnidirectional mobility platform can be constructed.

Universal wheel designs may exhibit good omnidirectional mobility however they tend to be complicated in terms of mechanical structure. Another major drawback of these designs is the limited load capacity for platforms built based on these designs because of the fact that the loads are supported by the slender rollers in the universal design or by the contact point with the floor in the orthogonal wheel and ball wheel designs. There are also sensitive to floor conditions as the surmountable height is limited by the small diameter of the rollers. The universal wheel design is also susceptible to vibrations as the rollers make successive contact with the ground. Additionally, these designs are not well-suited to carpeted or dirty floors because of the nature of their mechanisms.

Conventional wheels are inherently simple. As used herein, a "conventional wheel" refers to a rigid circular ring capable of rotation about a central transverse axis of rotation by virtue of mechanical coupling (as by spokes, for example) of the ring to an axle coaxial with the axis of rotation. Conventional wheels may have high load capacity and high tolerance to floor non-idealities such as bumps and cracks, dirt and debris. Various designs have been conceived to increase the mobility for platforms using conventional wheels. The most common designs are those using steered wheels. The platform has at least two active wheels with both driving and steering actuators. It can move at arbitrary directions from arbitrary configurations. But these type of systems are not truly omnidirectional because they need to stop and reorient the wheels to the desired direction whenever they need to travel in a trajectory with non-continuous curvatures.

One technique to use the conventional wheel for omnidirectional mobility is to use the active castor design as described by Wada & Mori, Holonomic and Omnidirectional Vehicle with Conventional Tires, *Proc. IEEE Conf. on Robotics and Automation*, pp. 3671–3676, (April, 1996). Wada & Mori describe an active wheel 10 fixed to a steering link 12, as shown in FIG. 1. Steering link 12 may be driven by a steering motor 14 and can rotate freely about a steering axis 16 fixed with respect to chassis 18 of the platform. Steering link 12 has an offset from the axis 20 of wheel 10, as shown. With at least two sets of such wheels omnidirectional mobility can be achieved for a platform. Active control of dual-wheel castors is described by Wada in U.S. Pat. No. 5,924,512 which is incorporated herein by reference.

SUMMARY OF THE INVENTION

In accordance with one aspect of the invention, in one of its embodiments, there is provided a mobile base for providing omnidirectional maneuverability. The mobile base has a rigid platform and at least two offset wheel assemblies. Each offset wheel assembly has two wheels having axles aligned along a common axis. The axles are free to rotate about an axis parallel to the planes of rotation of the wheels. Each offset assembly further includes a mechanical link that is pivotally coupled to a pivot point on the rigid platform, and the mechanical link supports the two wheels in such a manner that the common axis of the wheels is displaced from the pivot point. The assembly also includes a rotary actuator for independently driving each wheel.

In accordance with alternate embodiments of the invention, the common axis of the two wheels of each offset wheel assembly may be substantially perpendicular to a line connecting the midpoint between the centers of the wheels to the pivot point. The mobile base in accordance may also have a user input device for steering the mobile base in a specified direction and with a specified velocity.

Additionally, the mobile base may have at least one sensor for sensing a velocity of a wheel. At least one passive wheel may be provided for supporting the platform.

In accordance with a further aspect of the present invention, there is provided an omnidirectional vehicle. The omnidirectional vehicle has a support for supporting a load and at least two offset wheel assemblies. Each offset wheel assembly has two wheels having axles aligned along a common axis. The axles are free to rotate about an axis parallel to the planes of rotation of the wheels. A mechanical link pivotally coupled to a pivot point on the support supports the two wheels in such a manner that the common axis is displaced from the pivot point. A rotary actuator is included in each assembly for independently driving each wheel.

In accordance with another aspect of the present invention, an offset wheel assembly for providing omnidirectional maneuverability includes two wheels having axles aligned along a common axis. The axles are free to rotate about an axis parallel to the planes of rotation of the wheels. A mechanical link having a long axis supports the two wheels, and a rotary actuator drives each wheel independently.

In accordance with a further aspect of the present invention, a method for providing omnidirectional control of a vehicle having a platform includes providing at least two offset wheel assemblies. Each of the offset wheel assemblies has two wheels that share a common axis and a mechanical link pivotally coupled to an offset link joint on the platform. The mechanical link supports the two wheels in such a manner that the common axis is displaced from the offset link joint. A user specified platform velocity is received, and the user specified platform velocity vector is transformed to obtain a unique joint velocity for each of the offset link joints. Each offset link joint velocity vector is transformed to obtain a unique rotational velocity for each of the wheels, and a torque is applied to each wheel to cause each wheel to attain the unique rotational velocity. The user specified platform velocity vector is thus achieved. In addition, at least one rotary actuator may be driven when applying the torque.

BRIEF DESCRIPTION OF THE DRAWINGS

The foregoing features of the invention will be more readily understood by reference to the following detailed description taken with the accompanying drawings in which.

The above drawings are to be interpreted as illustrative and not in a limiting sense.

DETAILED DESCRIPTION OF PREFERRED EMBODIMENTS

A fundamental cause of the steering problem discussed in the Background Section of this Description is that wheels experience larger frictional forces when steering around a vertical axis than in rolling around the wheel axis. The scrubbing problem may be reduced by using two wheels separated at a distance and connected with a steering link, as described in U.S. Pat. No. 5,242,131, issued Sep. 7, 1993 and U.S. Pat. No. 5,704,568, issued Jan. 6, 1998, both to Watts and both incorporated herein by reference. Wheels in the dual wheel design are always rolling, even during steering, so that the frictional forces the wheel experiences are consistent and smaller while traction forces are greater than provided by a single wheel.

Figure 1:
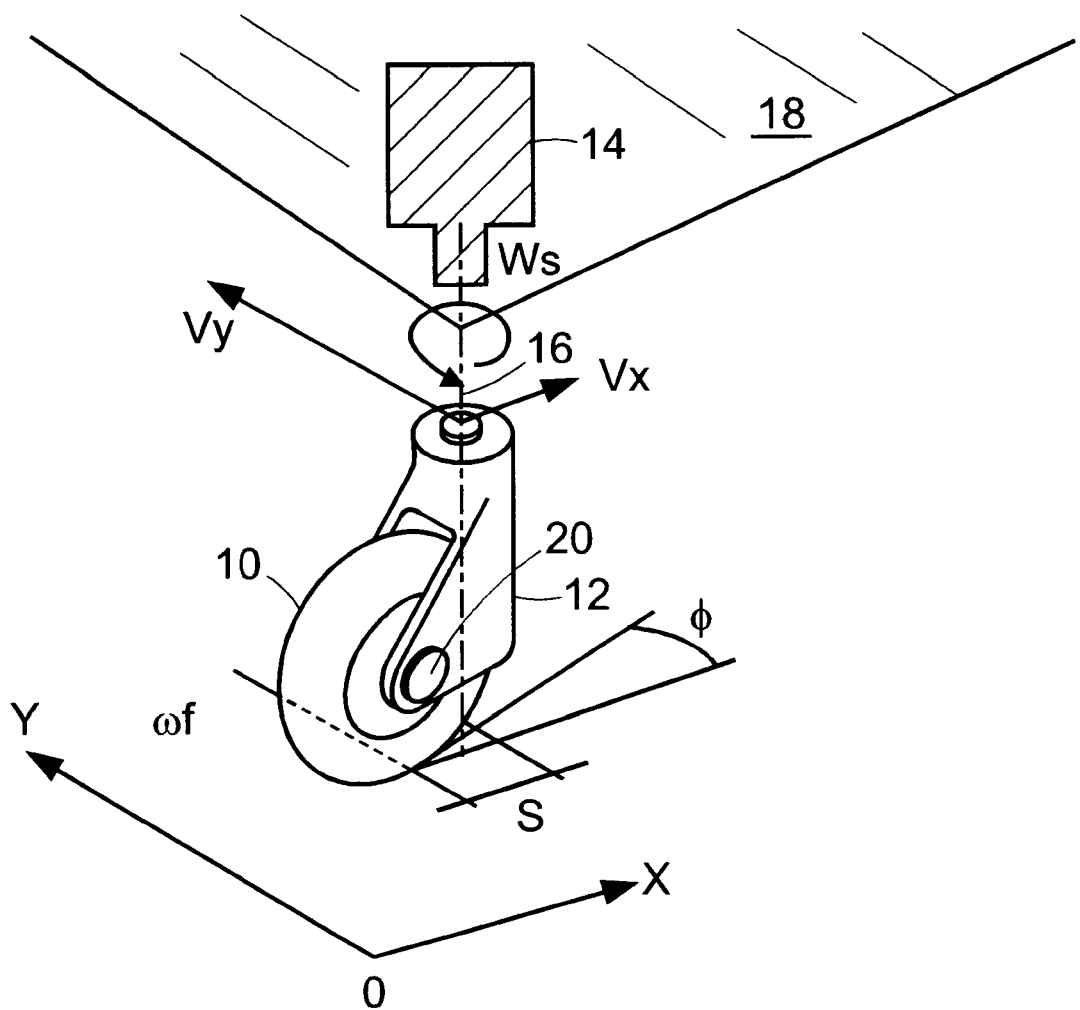
FIG. 1 is a perspective view of a prior art active castor wheel.
Figure 2:
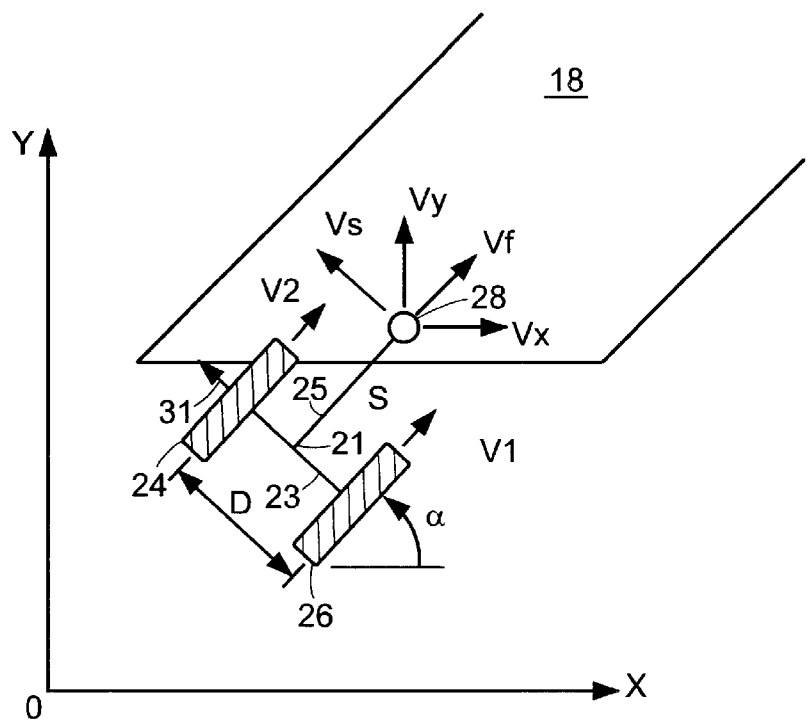
FIG. 2 provides definitions of the nomenclature involved in the description of an offset active dual wheel assembly in accordance with an embodiment of the present invention.

Referring now to FIG. 2, nomenclature is depicted as used to describe two wheels 24, 26 rotatable about axle 23 and coupled via rigid offset link 25 to platform 18. Alternatively, two coaxial axles may be used. A "mobile base" will refer to the ground contacting portion of any vehicle or other mobile apparatus. For purposes of this description and any appended claims, a "platform" (or chassis) designates any rigid structure to which wheel assemblies are coupled. The point at which platform 18 is coupled to link 25 and thereby supported as designated by numeral 28. The two wheels 24 and 26 of each offset wheel assembly may share a common axis 31 as shown, and the common axis 31 may be substantially perpendicular to a line connecting the midpoint 21 between centers of the wheels to the point 28. The instantaneous velocity of support point 28 may be expressed in terms of a coordinate system defined by the instantaneous orientation of link 25 (i.e., in terms of orthogonal velocity components $V_S$ and $V_f$) or in terms of a space-fixed coordinate frame (i.e., in terms of orthogonal velocity components $V_x$ and $V_y$). S expresses the distance between axle 23 of wheels 24, 26 and support point 28. $V_2$ and $V_1$ express the tangential velocities, at the surface, of wheels 24 and 26 respectively. Thus, in the link based coordinate system, the velocities of support point 28 are given, in terms of the wheel velocities, as:

$$\begin{bmatrix} V_f \\ V_s \end{bmatrix} = \begin{bmatrix} \frac{1}{2} & \frac{1}{2} \\ \frac{S}{D} & -\frac{S}{D} \end{bmatrix} \begin{bmatrix} V_1 \\ V_2 \end{bmatrix},$$

while the velocities are given, in a space-fixed frame, with respect to which link 25 is oriented at angle α, by:

$$\begin{bmatrix} V_x \\ V_y \end{bmatrix} = \begin{bmatrix} \cos\alpha & -\sin\alpha \\ \sin\alpha & \cos\alpha \end{bmatrix} \begin{bmatrix} V_f \\ V_s \end{bmatrix}.$$

Figure 3:
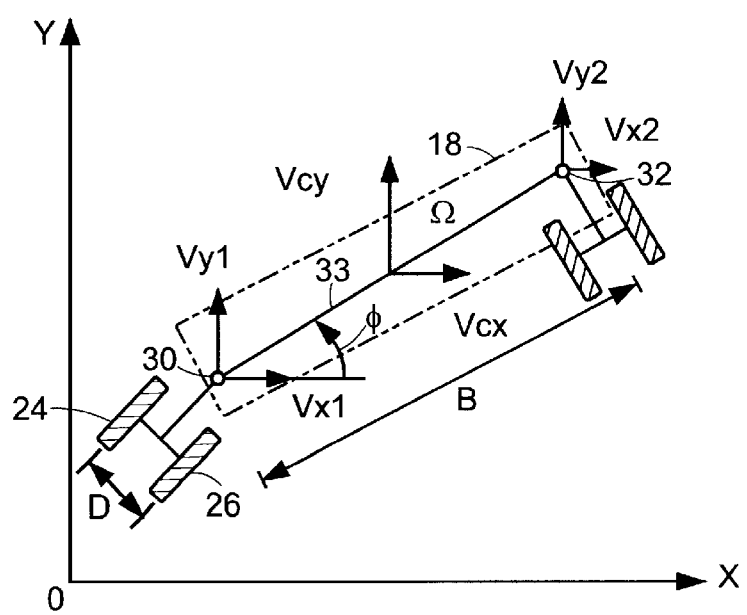
FIG. 3 is a schematic drawing of an omnidirectional platform employing two offset dual wheel assemblies in accordance with an embodiment of the present invention.

In terms of this nomenclature, preferred embodiments of this invention provide a novel concept of wheel assembly design for omnidirectional mobility using convention wheels. Referring now to FIG. 3, a rigid body platform 18 may be supported by two points in a plane, the points designated by numerals 30 and 32. The motion of rigid body platform 18 in the plane is fully specified in terms of the three degrees of freedom: translation in the X and Y directions and rotation by angle φ about a fiducial direction. Equivalently, the motion can be fully defined by the velocities at the two points 30 and 32. Control of the velocities at the two points, as indicated by the subscripted variables, V, provides arbitrary (in the sense defined above), omnidirectional mobility for the rigid body platform.

Figure 5:
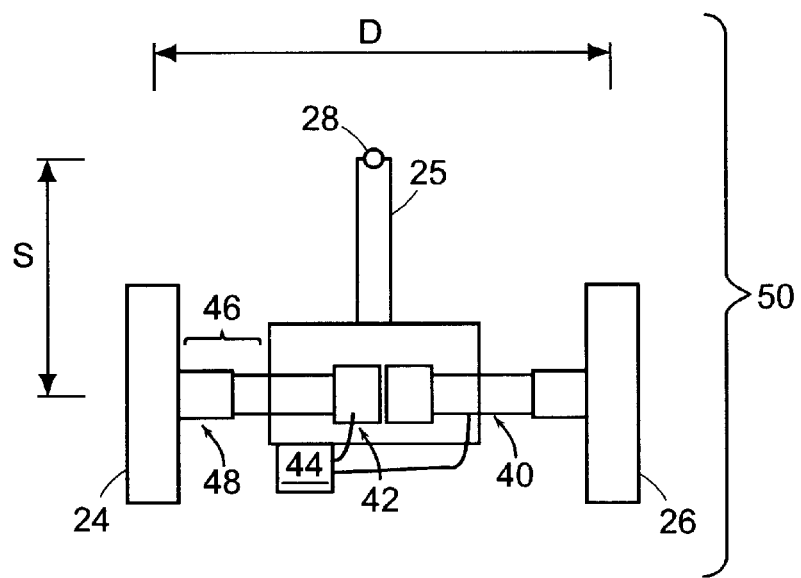
FIG. 5 is a schematic top view of an offset dual wheel assembly in accordance with an embodiment of the present invention.

Accordingly, an active dual wheel assembly 50, (shown in FIG. 5) consisting of a pair of independently driven wheels 24 and 26, separated at a distance D and connected with an offset link 25 to the platform 18 may be provided, in accordance with preferred embodiments of the present invention. By controlling the velocities of the two wheels, arbitrarily specified velocities may be achieved at the joint 30 of the link 25. Referring to FIG. 5, each wheel 24, 26 is equipped with a rotary actuator, such as motor 40, and a sensor 42 (such as a rotary encoder or tachometer, for example) to provide input to a processor 44 which provides wheel velocity control. Wheels 24, 26 are substantially coaxial and all wheels known in the mechanical arts are within the scope of the present invention, including but not limited to metal, rubber, or nylon wheels, or wheels having pneumatic tires. Motors 40 are coupled to respective wheels 24, 26 by drive 46 which may include a transmission 48. Each motor may be connected to a wheel directly or via a flexible coupling, gear pairs, belts, etc. Each link joint 28 where link 25 is coupled to the platform may also have an optional sensor (such as an encoder) to measure the joint position relative to the platform for error compensation during platform motion control. The distance D between the two driving wheels and the distance S between the wheel axis and the offset link can be variable to suit the requirements of particular applications. With a minimum of two sets of such wheel assemblies, an omnidirectional mobility platform can be built as illustrated in FIG. 3.

Referring again to FIG. 3, the velocity coordinates of the three degrees of freedom of the rigid platform are: Ω, the angular velocity of the center line 33 between points 30 and 32 with respect to a fixed direction in the space-based frame, and $V_{cx}$ and $V_{cy}$, the translational velocities of the rigid platform in the space-fixed frame. The kinematic relations among the rigid platform 18 and the velocities of the four wheels may be expressed as follows:

Designating the velocities of the rigid platform, with respect to each of its degrees of freedom, as follows:

$$p_v \equiv \begin{bmatrix} V_{cx} \\ V_{cy} \\ \Omega \end{bmatrix},$$

and the joint velocities of the pivot points, as follows:

$$q_v \equiv \begin{bmatrix} V_{x1} \\ V_{y1} \\ V_{x2} \\ V_{y2} \end{bmatrix},$$

the velocities of the two pivot joints may be expressed in terms of the velocities of the rigid platform uniquely as:

$$\dot{p}_v = J_v \dot{q}_v,$$

where the Jacobian velocity transformation is given by:

$$J_v = \begin{bmatrix} \frac{1}{2} & 0 & \frac{1}{2} & 0 \\ 0 & \frac{1}{2} & 0 & \frac{1}{2} \\ \frac{1}{B}\sin\phi & -\frac{1}{B}\cos\phi & -\frac{1}{B}\sin\phi & \frac{1}{B}\cos\phi \end{bmatrix},$$

and B is the spacing between pivot points 30 and 32, and φ is the instantaneous angle between center line 33 and the space-fixed x axis.

Solution for $\dot{q}_v$ (by inversion of $J_v$) determines the requisite pivot point velocities uniquely.

The pivot point velocities, in turn, determine the requisite rotation rates of each of the offset castor wheels, again, uniquely, since the relation between the pivot point velocities and the tangential velocities of wheels 24 and 26 is as given above. Thus, to achieve a desired motion of the platform, the torque to be applied by the respective rotary actuators is readily determined.

Additional description is provided in the preprint entitled "Omni-Directional Mobility Using Active Split Offset Castors," by Dubowsky et al., attached hereto as an appendix, and incorporated herein by reference.

Figure 4A:
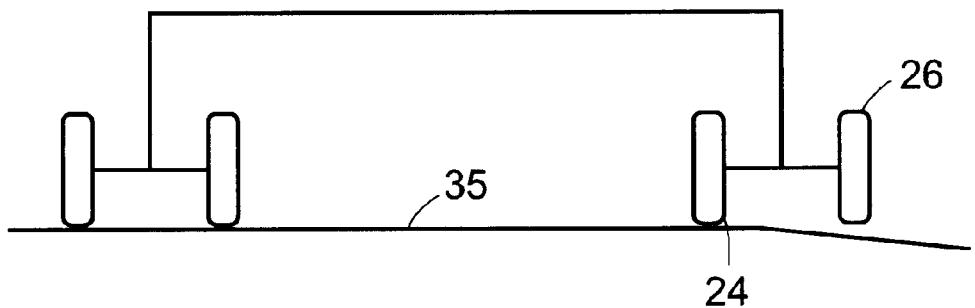
FIGS. 4(a) and 4(b) are schematic drawings of an omnidirectional platform employing two offset dual wheel assemblies in accordance with another embodiment of the present invention.
Figure 4B:
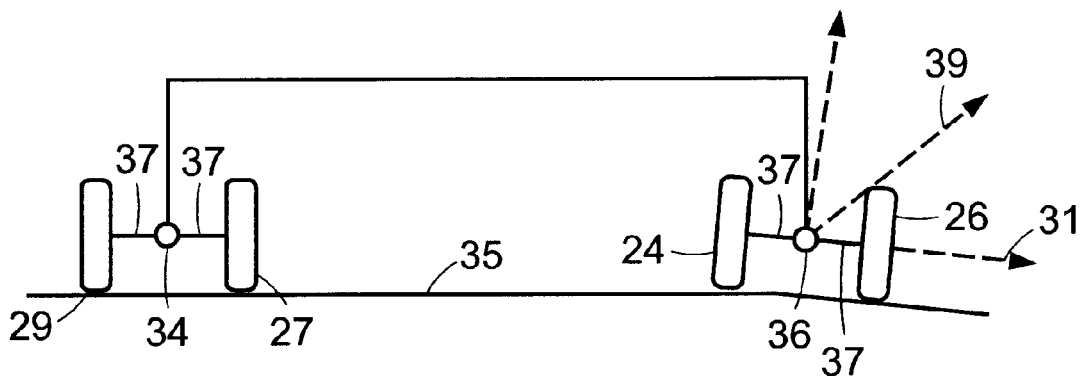

FIG. 4(a) illustrates a common problem with vehicles using some dual-wheel approaches. The wheels 24 and 26 do not both maintain contact with the ground 35. This causes a loss of traction, and hence a loss of control of the vehicle. Although some compliance in the wheel and the mechanical structure will alleviate this problem, it is often not sufficient. A simple but effective solution, which does not require a form of independent suspension, is illustrated in FIG. 4(b). Joints 34 and 36 have been added to the assembly to compensate for uneven ground surfaces. The wheels 24, 27, 26, and 29 have axles 37 aligned along a common axis 31. The axles 37 are free to rotate about an axis 39 parallel to the planes of rotation of the wheels 24 and 26. This additional degree of freedom insures that all of the wheels 24 27, 26, and 29 maintain contact with the ground 35. In this manner, loss of traction in the wheels is prevented and control of the platform is maintained. More particularly, joints 34 and 36 may be passive joints.

The omnidirectional platform of the various embodiments of the present invention may be controlled either by on-board processors 44 or off-board computers connected by wires or via wireless means.

Figure 6:
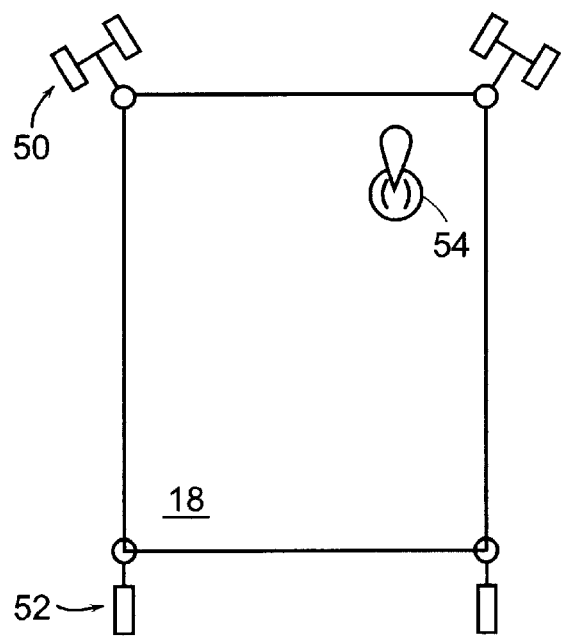
FIG. 6 is a schematic top view of an omnidirectional platform employing two offset dual wheel assemblies and two passive castor wheels in accordance with an embodiment of the present invention.
Figure 7:
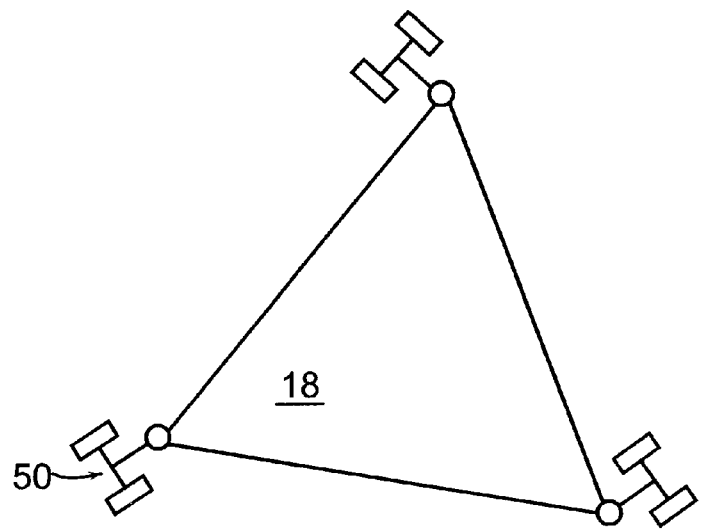
FIG. 7 is a schematic top view of an omnidirectional platform employing three offset dual wheel assemblies in accordance with an alternate embodiment of the present invention.
Figure 8:
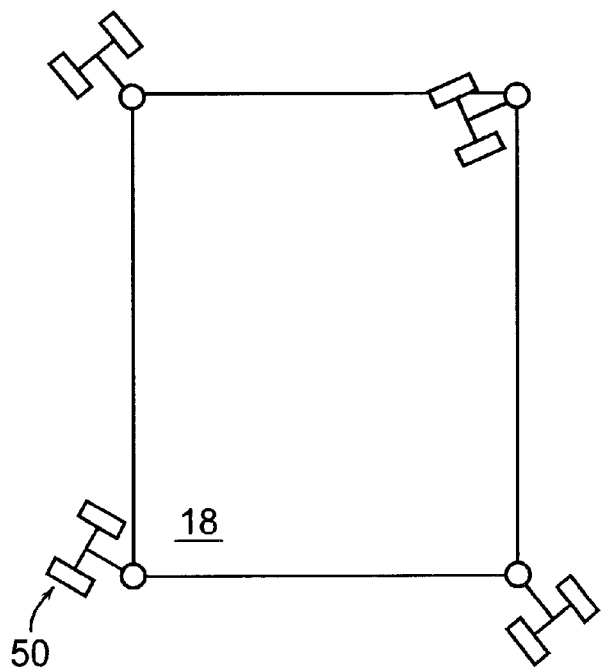
FIG. 8 is a schematic top view of an omnidirectional platform employing four offset dual wheel assemblies in accordance with an alternate embodiment of the present invention.

In order to achieve fully omnidirectional mobility, two active dual wheel assemblies 50 are provided, as depicted in FIG. 3. Additionally, one or more passive castor wheels 52 may be provided to support platform 18, as shown in FIG. 6. Castor wheel 52 may present a non-consistent friction problem, and, in certain embodiments of the invention, it may be advantageous to provide three active dual wheel assemblies 50, as shown in FIG. 7. In this manner, additional traction and stability may be achieved. Similarly, four or more active dual wheel, assemblies 50 may be provided, in accordance with alternate embodiments of the invention, as shown in FIG. 8. A user input device 54 (shown in FIG. 6), such as a steering wheel, joystick, etc., is provided for allowing a user, conveyed by the platform or otherwise, to specify the direction and/or magnitude of desired motion. User input device 54 may be a computer.

Since preferred embodiments of the present invention use conventional wheels, the structure of the wheel assembly may be simple and may provide high mechanical strength. Mobility platforms based on this concept may advantageously have high loading capacity and be less sensitive to floor conditions and other non-idealities on the application environments. The dual wheel design effectively alleviates the problem of scrubbing during steering. The dual wheel design also increases the traction of the platform and increases the disturbance force rejection capability. Compared with other dual-wheel design, the platform based on this invention does not need to stop and reorient the wheels when tracking a trajectory with discontinuous curvatures.

This invention can be used to build intelligent mobile robotic devices with omnidirectional mobility capability for applications that need excellent maneuverability in congested environments with dynamic obstacles. Typical devices can be the medicine, food, and file dispatching robots in hospitals; personal assistive robots such as smart walkers and wheelchairs for elderly or disabled people in private home and eldercare facilities; and material handling robots in workshops and warehouse. It may also be used in conjunction with mobile platforms on which robotic manipulators, observation, and surveillance equipment can be mounted for applications in both military and industry.

The described embodiments of the invention are intended to be merely exemplary and numerous variations and modifications will be apparent to those skilled in the art. All such variations and modifications are intended to be within the scope of the present invention as defined in the appended claims.

We claim:

1. A mobile base for providing omnidirectional maneuverability, the mobile base comprising:
   a. a rigid platform;
   b. at least two offset wheel assemblies, each offset wheel assembly comprising:
      i. two wheels having axles aligned along a common axis, the axles being free to rotate about an axis parallel to the planes of rotation of the wheels,
      ii. a mechanical link pivotally coupled to a pivot point on the rigid platform and supporting the two wheels in such a manner that the common axis is displaced from the pivot point, and
      iii. a rotary actuator for independently driving each wheel; and
   c. a processor in communication with the rotary actuator for transforming a specified platform velocity vector to obtain a unique rotational velocity for each of the wheels.

2. A mobile base in accordance with claim 1, wherein the common axis of the two wheels of each offset wheel assembly is substantially perpendicular to a line connecting the midpoint between centers of the wheels to the pivot point.

3. A mobile base in accordance with claim 1, wherein the rotary actuator includes at least one motor.

4. A mobile base in accordance with claim 1, further including an input device for steering the mobile base in a specified direction.

5. A mobile base in accordance with claim 1, further including at least one sensor for sensing a velocity of a wheel.

6. A mobile base in accordance with claim 1, further including a control loop for correcting deviations of the mobile base from a specified velocity vector.

7. A mobile base in accordance with claim 1, further including at least one passive wheel for supporting the platform.

8. An omnidirectional vehicle comprising:
   a. a support for supporting a load;
   b. at least two offset wheel assemblies, each offset wheel assembly comprising:
      i. two wheels having axles aligned along a common axis, the axles being free to rotate about an axis parallel to the planes of rotation of the wheels,
      ii. a mechanical link pivotally coupled to a pivot point on the support and supporting the two wheels in such a manner that the common axis is displaced from the pivot point, and
      iii. a rotary actuator for independently driving each wheel; and
   c. a processor in communication with the rotary actuator for transforming a specified platform velocity vector to obtain a unique rotational velocity for each of the wheels.

* * * * *